United States Patent
Latwesen

(10) Patent No.: US 7,996,096 B2
(45) Date of Patent: Aug. 9, 2011

(54) ESTIMATION OF PROCESS CONTROL PARAMETERS OVER PREDEFINED TRAVEL SEGMENTS

(75) Inventor: Annette L. Latwesen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 639 days.

(21) Appl. No.: 12/040,493

(22) Filed: Feb. 29, 2008

(65) Prior Publication Data

US 2009/0222124 A1 Sep. 3, 2009

(51) Int. Cl.
- *G05B 13/02* (2006.01)
- *G06F 19/00* (2006.01)
- *G06F 15/00* (2006.01)
- *G06F 11/30* (2006.01)
- *G21C 17/00* (2006.01)

(52) U.S. Cl. .......... 700/52; 700/110; 702/184; 702/185; 714/37; 714/47

(58) Field of Classification Search .................. 700/28, 700/29, 52, 108–110, 164, 250, 254; 702/182–185, 702/189, 190, 199; 714/100, 1, 2, 25, 33, 714/37, 46–48, 57

See application file for complete search history.

(56) References Cited

U.S. PATENT DOCUMENTS

| | | | |
|---|---|---|---|
| 3,805,044 A * | 4/1974 | Bhattacharyya et al. | 117/69 |
| 5,687,098 A | 11/1997 | Grumstrup et al. | |
| 5,966,679 A | 10/1999 | Snowbarger et al. | |
| 5,988,856 A * | 11/1999 | Braunstein et al. | 700/160 |
| 6,261,238 B1 * | 7/2001 | Gavriely | 600/532 |
| 6,539,343 B2 * | 3/2003 | Zhao et al. | 702/190 |
| 6,609,036 B1 | 8/2003 | Bickford | |
| 6,862,541 B2 * | 3/2005 | Mizushima | 702/76 |
| 6,917,839 B2 * | 7/2005 | Bickford | 700/30 |
| 7,171,561 B2 * | 1/2007 | Noga | 713/176 |
| 7,295,944 B2 * | 11/2007 | Morton et al. | 702/99 |
| 7,664,618 B2 * | 2/2010 | Cheung et al. | 702/183 |
| 7,734,396 B2 * | 6/2010 | Hattori et al. | 701/49 |
| 7,739,067 B2 * | 6/2010 | Shumaker et al. | 702/99 |
| 2004/0031779 A1 * | 2/2004 | Cahill et al. | 219/121.83 |
| 2005/0107962 A1 | 5/2005 | Zhan et al. | |
| 2006/0064037 A1 * | 3/2006 | Shalon et al. | 600/596 |
| 2007/0058554 A1 * | 3/2007 | Benlarbi | 370/248 |
| 2008/0107225 A1 * | 5/2008 | Hashemian et al. | 376/247 |
| 2009/0319060 A1 * | 12/2009 | Wojsznis et al. | 700/30 |

OTHER PUBLICATIONS

Niemela, "Open FDT/DTM software technology enhances diagnostics and optimises control valve performance", Control Valves, Oct. 2005, pp. 79-85, retrieved from the Internet, URL: http://www.metsoautomation.com/automation/web_articles_valves.nsf/WebWid/WTB-051128-22570-14043/$File/Open%20FDT-DTM.pdf>.

"Valve Monitor Diagnostics for Positioners SRD960/SRD991", Foxboro [Online] 2006, pp. 1-8, URL: http://www.ips.invensys.com/en/products/measurement/Documents/Valve%20Positioner/valve_positioner_brochure.pdf>.

International Search Report for PCT/US2009/031272, mailed May 7, 2009.

* cited by examiner

*Primary Examiner* — Crystal J Barnes-Bullock

(57) ABSTRACT

A method of determining a segment-specific estimate of a parameter associated with a process control loop includes receiving signal data corresponding to a signal from a process control loop, storing the signal data, partitioning the stored signal data into a plurality of data segments and performing a statistical analysis on a first one of the plurality of data segments selected from the plurality of data segments to generate a first segment-specific parameter estimate.

26 Claims, 9 Drawing Sheets

FIG. 6
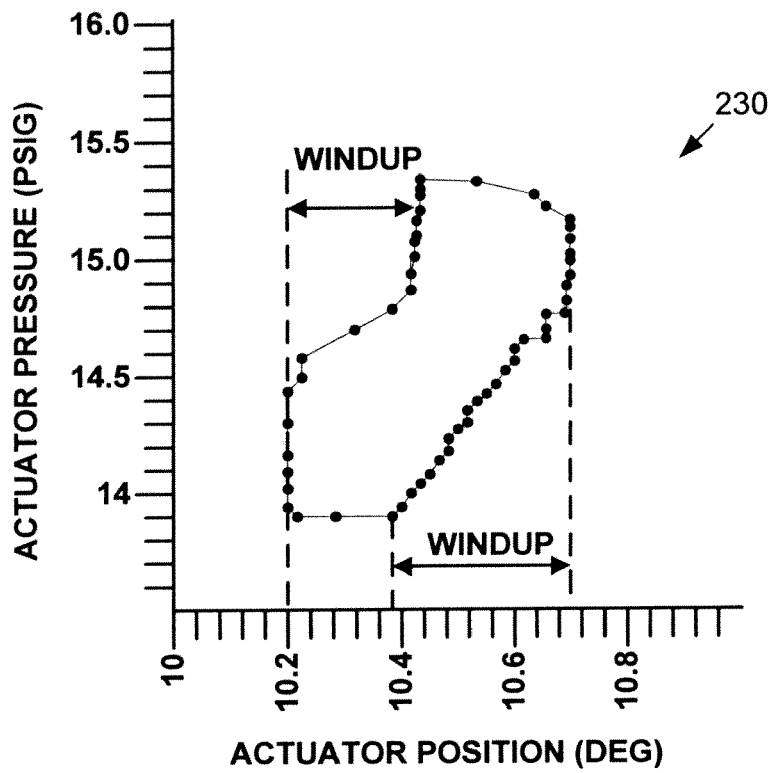
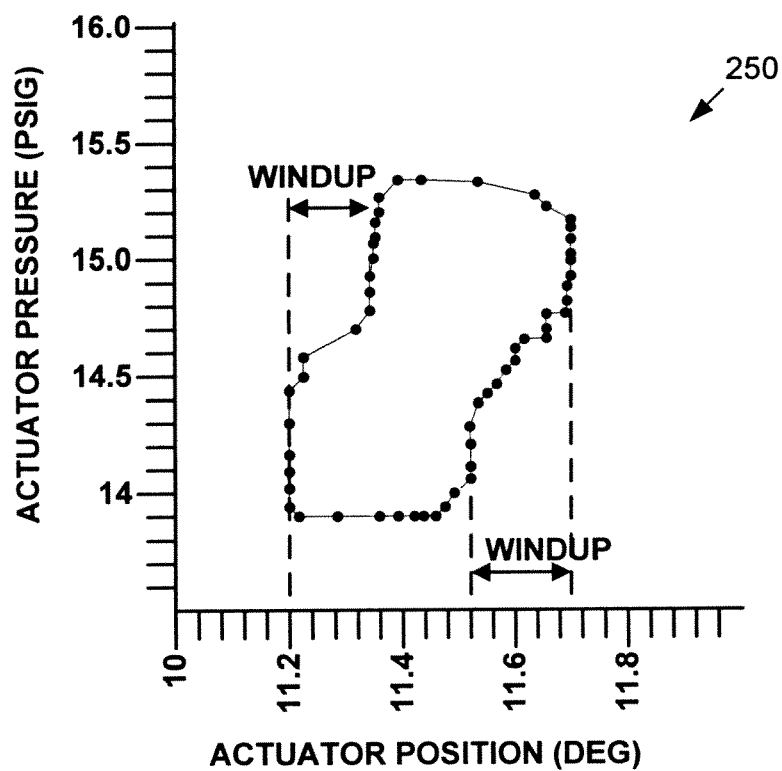

ESTIMATION OF PROCESS CONTROL PARAMETERS OVER PREDEFINED TRAVEL SEGMENTS

FIELD OF THE INVENTION

The present invention relates generally to process control networks and, more particularly, to a method of statistically determining an estimate of a process control loop parameter over a predetermined segment of travel or operation.

DESCRIPTION OF THE RELATED ART

Large scale commercial manufacturing and refining processes typically use a process controller system to control the operation of one or more process control devices such as valves, based on feedback from one or more sensors, such as position, flow, temperature or other types of sensors. Each set of such process control devices, valves, and sensor devices form what is generally referred to as a process control loop. Furthermore, each valve or other device may, in turn, include an inner loop wherein, for example, a valve positioner controls a valve actuator to move a control element, such as a valve plug, in response to a control signal and obtains feedback from a sensor, such as a position sensor, to control movement of the valve plug. This inner loop is sometimes called a servo loop. In any event, the control element of a process control device may move in response to changing fluid pressure on a spring biased diaphragm or in response to the rotation of a shaft, each of which may be caused by a change in the command signal. In one standard valve mechanism, a command signal with a magnitude varying in the range of 4 to 20 mA (milliamperes) causes a positioner to alter the amount of fluid and thus, the fluid pressure, within a pressure chamber in proportion to the magnitude of the command signal. Changing fluid pressure in the pressure chamber causes a diaphragm to move against a bias spring which, in turn, causes movement of a valve plug.

Process control devices usually develop or produce a feedback signal, indicative of the response of the device to the command signal, and provide this feedback signal (or response indication) to the process control system or to the valve actuator for use in controlling the process or the valve. For example, valve mechanisms typically produce a feedback signal indicative of the position (e.g., travel) of a valve plug, the pressure within a fluid chamber of the valve or the value of some other phenomena related to the actual position of the valve plug.

While a process control system generally uses these feedback signals, along with other signals, as inputs to a highly tuned, centralized control algorithm that effects overall control of a process, it has been discovered that poor control loop performance may still be caused by poor operating conditions of the individual control devices connected within the control loop including, for example, instabilities within the process control loop. A system experiences "instability" when it cannot reach an equilibrium point during operation. Plant personnel often refer to these instabilities as cycling, hunting, or swinging which is in contrast with normal operation in which the system reaches an equilibrium point or "lines-out."

In many cases, problems associated with one or more of the individual process control devices cannot be tuned out of the control loop by the process control system and, as a result, the poorly performing control loops are placed in manual or are detuned to the point where they are effectively in manual control. In some cases, plant personnel can track down individual loops that are cycling and will detune the associated controller or place the faulty loop into manual. If the system settles down, they know that it is a tuning problem, not a hardware problem. In a similar fashion, if the process has well known, fast dynamics (such as a flow loop), operators will correlate the controller output with the process variable. If the output of the controller is a triangle wave and the process variable is a square wave, they will often conclude that the control valve is sticking. These ad-hoc procedures are used by many plant operators, but include several limitations. For example, the first procedure requires the operator to put the system into manual control, which may not be allowed, especially on runaway processes. The second procedure is good for identifying limit cycles induced by the process control loop but is not capable of tracking down instabilities in the servo loop. Moreover, correlation between a command signal and a process variable is not always straightforward due to complications such as integrating process dynamics, nonlinear process dynamics, cross-coupled process dynamics, and process disturbances. Instabilities in the servo loop can be particularly difficult to discern because plant personnel do not have access to the internal state variables of a control valve. Additional problems arise when instabilities are influenced by the process fluid, as is the case with negative gradients. In these situations, a valve can oscillate when in service, but becomes well behaved when it is taken off line.

Poor control loop performance can usually be overcome by monitoring the operational condition or the "health" of each of the process control devices connected within the loop, or at least the most critical process control devices connected within the loop, and repairing or replacing the poorly performing process control devices. The health of a process control device can be determined by measuring one or more parameters associated with the process control device and determining if the one or more parameters is outside of an acceptable range. One of the problems that may be monitored is the detection of instabilities in a process loop or a control device.

In the past, it was not easy to determine the source or cause of an instability within a process control loop without having a technician review and diagnose the system, which could be time consuming and costly. In some cases these persons had to remove a process control device from a control loop to bench test the device or, alternatively, the control loops themselves were provided with bypass valves and redundant process control devices to make it possible to bypass a particular process control device to thereby test a device while the process is operating. Alternatively, operators have had to wait until a process is halted or is undergoing a scheduled shutdown to test the individual process control devices within the process which might be the source of instability. Each of these options is time consuming, expensive, and only provides intermittent determination of instabilities in a system. Still further, none of these methods is particularly suited to determine the source or cause of instability while the process is operating on-line, i.e., without disturbing or shutting the process down.

There have been some attempts to collect data from a process control device on-line and to obtain an indication of characteristics of a device therefrom. For example, U.S. Pat. No. 5,687,098 to Grumstrup et al. discloses a system that collects device data and constructs and displays the response characteristic of the device. Likewise, U.S. Pat. No. 5,966,679 to Latwesen et al. entitled "Method of and Apparatus for Nonobtrusively Obtaining On-Line Measurements of a Process Control Device Parameter" discloses a system that collects device data on-line and uses this data to directly calculate certain device parameters, such as dead band, dead time, etc. The entire disclosure of the '679 patent is hereby expressly incorporated by reference herein.

Additionally, the entire disclosure of the U.S. Pat. No. 6,466,893, entitled "Statistical Determination of Estimates of Process Control Loop Parameters," is also hereby expressly incorporated by reference herein. The '893 patent discloses a method of statistically determining estimates of one or more process loop parameters, such as friction, dead band, dead time, oscillation, shaft windup or backlash of a process control device. In particular, the method involves collecting signal data related to an output parameter and to an input parameter, storing the signal data as a series of discrete points, eliminating some of the points in the series according to a predefined algorithm, and performing a statistical analysis of the reduced series to obtain an average value of one or more process control parameters. The method allows estimating average actuator friction for a sliding stem valve, for example.

However, the method discussed in the U.S. Pat. No. 6,466,893 is limited to determining an average value of a process control parameter over an entire range covered by the available data. For example, the method can yield an overall value of friction associated with a complete range of motion of a moveable element. Meanwhile, there may be a section, a sub-range, or segment of travel where friction is significantly higher or lower than in the other sections. As one of ordinary skill in the art will recognize, high friction in a particular section may indicate that the valve is "sticking" and responding poorly to the control signal or unable to provide proper shutoff. On the other hand, low friction may indicate that the valve packing, which may used as a sealant between the stem and a wall of the valve, is degrading. In either case, the segments where friction significantly deviates from the norm or from the neighboring sections may require maintenance, replacement or, at the very least, close inspection. Unfortunately, the average friction value effectively masks aberrant friction values of the potentially problematic sections. Understandably, if travel covers a range substantially wider than a problem region, the average value may filter out the unusually high or low values. Thus, the average value may simply fail to reflect that one or more segments is faulty.

Moreover, even when the average value properly indicates that a problem exists, this value alone cannot point to the specific segment of travel or range of operation that may require attention. For example, based on an unsatisfactory average value of friction of a sliding stem valve, one may decide that an entire component of the valve (or even the entire valve) may need to be replaced. Meanwhile, it may be desirable in many cases to know the precise or relatively precise location of the problem. This information may help to conduct a partial repair or, at least, to collect statistical data related to failures in order to determine which components are least reliable and possibly improve the design of these components in the future.

SUMMARY

A method of estimating a process control parameter of a device over a segment of travel of a moveable component of the device allows an operator or engineer to determine whether the moveable part operates improperly in one or more sections within the full range of operation of the moveable part. In particular, the method obtains measurements of a signal inside a process control loop, stores the measured signal as signal data, partitions the signal data into several sections corresponding to various segments of travel or operation, and performs an analysis on some or all of the sections of the signal data to determine parameter estimates for one or more segments. In one aspect, the sections of data correspond to non-overlapping segments of equal size to facilitate visual and statistical comparison between segments. In another aspect, the signal data may be partitioned into segments according to a specified percentage of travel, to a desired number of segments, or to a predefined amount of data contained in an individual segment.

In one embodiment, the method unobtrusively measures a signal within the process control loop while the process control loop is connected on-line within a process environment. In at least some of the embodiments, the method can be applied in real time as data is collected from a process control loop. Additionally or alternatively, the method can be applied to offline data.

In one embodiment, the parameter estimate corresponding to each segment is rendered graphically on a display. In another embodiment, software running on a device inside or outside the process control loop automatically processes parameter estimates for some or all of the segments and detects aberrant parameter values. In another aspect, the method may be implemented within a software package for configuring, monitoring, and displaying parameters related to valve operation, such as AMS ValveLink® from Fisher Controls International LLC of Marshalltown, Iowa. In another embodiment, the method may be implemented on a device collecting on-line process control data. In another aspect, the method may be applied to signal data stored offline. The method may also include comparing historical data for the same segment in order to measure the trend over time of a selected process parameter. In particular, a certain parameter may be estimated for one or more selected segments at predefined intervals, such as once per week, for example. In accordance with this embodiment, the weekly estimates may be rendered on a single graph or processed automatically to detect a change in value over time. In another aspect, the method may utilize statistical techniques such as calculating the standard deviation, mean and average values for the entire range of travel, and other parameters useful in comparing individual segments of travel to other segments or the entire range of travel.

The parameter estimate may be an estimate of the friction of a device (such as a valve or other device) having an actuator (which may be any moveable part of the device) that moves in response to actuator pressure. In this case, the method measures a first signal indicative of actuator pressure, measures a second signal indicative of actuator position and then stores a series of data points, each data point having an actuator pressure component derived from the actuator pressure signal and an actuator position component derived from the actuator position signal. For each segment, the method may create a reduced data set from the corresponding section of the series of data points and determine the friction estimate from the reduced data set. To create the reduced data set, each of the series of data points in the section is analyzed to determine if the data point is outside of a friction zone of the device and is placed within the reduced data set if the point is outside of the friction zone. To determine if a data point is outside of the friction zone, the difference between the actuator position components of two data points may be compared to a threshold, the difference between the actuator pressure components of two data points may be compared to a threshold or the slope at a data point may be compared to a slope threshold. Thereafter, the reduced data set may be detrended to remove linear trends, the actuator pressure components of the detrended data set may be histogrammed and a pressure difference based on the results of the histogram may be used to determine the friction estimate.

The parameter estimate may also be a dead band estimate which can be determined from the friction estimate for a particular segment and the open loop gain associated with the process control loop. Likewise, the parameter estimate may be a dead time estimate which can be developed by performing a cross-correlation analysis or a sum squared error analysis on the stored signal data for a particular segment and selecting a time delay associated with the cross-correlation analysis or the sum squared error analysis as the dead time estimate.

The parameter estimate may also be a segment-specific shaft windup estimate of a device that has an actuator. In this case, the stored signal may be an indication of the actuator position and the shaft windup estimate for each segment may be determined by identifying a plurality of consecutive data points that lie within a shaft windup span at a particular position, computing the shaft windup based on a difference between the actuator position of the end points of the plurality of consecutive data points, and repeating the procedure at the next position within the same segment of travel, and calculating the shaft windup value for a particular segment by averaging shaft windup measurements for all positions within the segment. If desired, the plurality of consecutive data points that lie within a shaft windup span may be also determined by computing the slope at each of the consecutive data points and comparing the computed slope to a slope threshold.

DETAILED DESCRIPTION OF THE DRAWINGS

FIG. 6 illustrates plots of actuator pressure versus actuator position for two segments of travel of a typical rotary valve.

DETAILED DESCRIPTION

Figure 1:
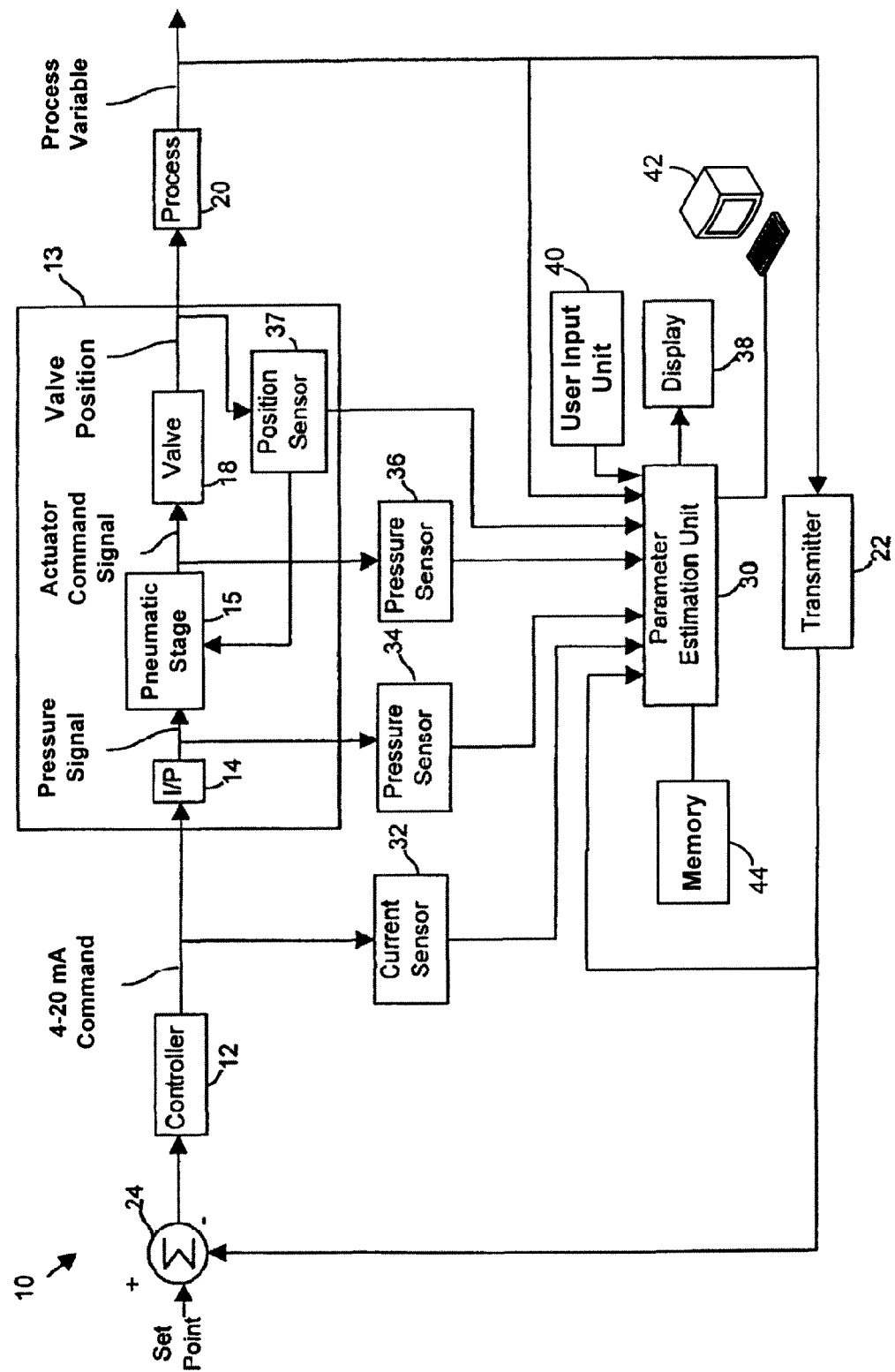
FIG. 1 is a block diagram illustrating a process control loop including a device that statistically determines segment-specific estimates for one or more loop parameters according to the present invention.

Referring to FIG. 1, a single-input, single-output process control loop 10 is illustrated as including a process control system 12 that sends, for example, a 4 to 20 mA command signal to a process control device 13 such as a control valve assembly. The process control device 13 is illustrated as including a current-to-pressure transducer (I/P) 14 that (typically) sends a 3 to 15 psig pressure signal to a valve pneumatic stage 15 such as a pneumatic positioner and actuator or a pneumatic relay and/or an actuator which, in turn, pneumatically controls a valve 18 with a pressure signal (air). Operation of the valve 18 controls the articulation of a movable valve member disposed therein (not shown) which, in turn, controls a process variable within a process 20. As is standard, a transmitter 22 measures the process variable of the process 20 and transmits an indication of the measured process variable to a summing junction 24. The summing junction 24 compares the measured value of the process variable (converted into a normalized percentage) to a set point to produce an error signal indicative of the difference therebetween. The summing junction 24 then provides the calculated error signal to the process control system 12. The set point, which may be generated by a user, an operator or another controller is typically normalized to be between 0 and 100 percent and indicates the desired value of the process variable. The process control system 12 uses the error signal to generate the command signal according to any desired technique and delivers the command signal to the process control device 13 to thereby effect control of the process variable.

While the process control device 13 is illustrated as including a separate I/P unit 14, pneumatic stage 15 and valve 18, the process control device 13 may include any other type of valve mechanisms or elements instead of or in addition to those illustrated in FIG. 1 including, for example, an electro-pneumatic positioner having an I/P unit integrated therein. Additionally, an electro-pneumatic positioner may also integrate an array of one or more sensors, and/or a memory, and/or a parameter estimation unit therein. Furthermore, it should be understood that the process control device 13 may be any other type of device (besides a valve controlling device) that controls a process variable in any other desired or known manner. The process control device 13 may be, for example, a damper, etc.

A parameter estimation unit 30 is coupled to the process control device 13 or to any other part of the process control loop 10 using known sensors. The parameter estimation unit 30, which may be a computer such as a microcomputer having a memory and a processor therein, collects data pertaining to the condition of the devices within the process control loop 10 and statistically determines from the collected data one or more process control loop parameters, such as friction, dead time, dead band, etc. using, for example, a computer program or algorithm. For example, as illustrated in FIG. 1, the measurement unit 30 may detect one or more of the command signal delivered to the I/P unit 14 using a current sensor 32, the pressure output from the I/P unit 14 using a pressure sensor 34, the actuator command signal output by the pneumatic stage 15 using a pressure sensor 36, and the valve position at the output of the valve 18 using a position sensor 37. If desired, the estimation unit 30 may also or alternatively detect the set point signal, the error signal at the output of the summing junction 24, the process variable, the output of the transmitter 22 or any other signal or phenomena that causes or indicates movement or operation of the process control device 13 or process control loop 10. It should also be noted that other types of process control devices may have other signals or phenomena associated therewith that may be used by the parameter estimation unit 30.

As will be evident, the parameter estimation unit 30 may also read an indication of the controller command signal, the pressure signal, the actuator command signal, or the valve position if the process control device 13 is configured to communicate those measurements. Likewise, the estimation unit 30 may detect signals generated by other sensors already within the process control device 13, such as the valve position indicated by the position sensor 37. Of course, the sensors used by the estimation unit 30 can be any known sensors and may be either analog or digital sensors. For example, the position sensor 37 may be any desired motion or position measuring device including, for example, a potentiometer, a linear variable differential transformer (LVDT), a rotary variable differential transformer (RVDT), a Hall effect motion sensor, a magneto resistive motion sensor, a variable capacitor motion sensor, etc. It will be understood that, if the sensors are analog sensors, the estimation unit 30 may include one or more analog-to-digital converters which samples the analog signal and stores the sampled signal in a memory within the estimation unit 30. However, if the sensors are digital sensors, they may supply digital signals directly to the estimation unit 30 which may then store those signals in memory in any desired manner. Moreover, if two or more signals are being collected, the estimation unit 30 may store these signals as components of data points associated with any particular time. For example, each data point at time $T_1, T_2, \ldots T_n$ may have an input command signal component, a pressure signal component, an actuator travel signal component, etc. Of course, these data points or components thereof may be stored in memory in any desired or known manner.

Furthermore, while the estimation unit 30 has been indicated as being separate from the process control device 13 (such as, for example, being located in a host device), this unit can instead be internal to the process control device 13 or any other process control device (e.g., field device) in a process control network. If the process control device 13 is a microprocessor based device, the estimation unit 30 can share the same processor and memory as that already within the process control device 13. Alternatively, the estimation unit 30 may have its own processor and memory. Thus, it is contemplated that the statistical analysis may be performed in the device in which the measurements are made (such as in any field device) with the results being sent to a user display or to a host device for use or, alternatively, the signal measurements may be made by a device (such as a field device) with such measurements then being sent to a remote location (such as a host device) where the statistical analysis is performed.

In one embodiment, the parameter estimation device 30 determines the friction, dead band, dead time or other process control loop parameter of one or more segments of travel of the process control device 13 (or other device within the process control loop 10) using a statistical analysis based on measurements taken while the process control device 13 is operating on-line within a process environment. In general, to develop a parameter estimate, the estimation unit 30 samples one or more signals within, for example, the process control device 13 and stores the sampled data in memory 44. If desired, the estimation unit 30 may manipulate the data to eliminate unneeded data, outliers, etc. either before or after storing the collected data in memory. After collecting enough data to be able to determine a statistical estimate of a desired process parameter for at least two segments of travel, the estimation unit 30 uses a statistical analysis routine, which may be stored in the memory 44 associated with the estimation unit 30 and implemented on a microprocessor within the estimation unit 30, to calculate an estimate of the process parameter for each of the segments. Of course, the estimation unit 30 may use any desired statistical analysis routine or procedure. Some example statistical analysis routines for certain parameters which may be implemented using an appropriately written computer program or algorithm stored within and implemented by the estimation unit 30 will be discussed in more detail herein.

After calculating a set of parameter estimates, the estimation unit 30 may display the estimates on a display device 38 which may be, for example, a CRT screen, a printer, a voice generator, an alarm, or any other desired communication device. Of course, the estimation unit 30 may alert the user to the values of the estimates in any other desired manner. A user input unit 40 may be connected to the estimation unit 30 in a wired or wireless manner. The user input unit 40 may be a full or a limited keyboard, a pointing device such as mouse, or any other means of entering data known in the art. By using the input unit 40, an operator or a technician may specify such parameters as the number of segments of travel, the size of a segment, the time interval for periodic signal capture, and the duration of a period during which signal data is collected by the parameter estimation unit 30.

Additionally or optionally, an operator, a technician, or an otherwise authorized user may use a computer workstation 42 to enter one or more parameters listed above (number of segments, segment size, etc). The computer workstation may be connected to the parameter estimation 30 and may include an inputting means such as a keyboard and a display. It will be appreciated that the analysis of the data and other work related to processing data collected from the sensors 32-37, sensor 22, as well from process 20 may be carried out by the parameter estimation unit 30 in cooperation with the workstation 42, or by one of the parameter estimation unit 30 or the workstation 42.

In those embodiments where the estimation unit 30 takes measurements of the required data while the process control device 13 is operating on-line, the estimation unit 30 does not require the process control device 13 to be taken off-line or out of the normal operating environment. In these embodiments, because the estimation unit 30 is connected to the process control loop 10 and measures the signals necessary to make the statistical estimation of certain process parameters during normal operation of the process control loop 10, the estimation unit 30 determines the process control device parameters continuously without interfering with the operation of the process 20 or the process control loop 10. Alternatively, the estimation unit 30 may estimate segment-specific process parameters by processing online data in post-time, or even by processing offline data. For example, the estimation unit 30 may process data corresponding to the measurements of one or several parameters of the control loop 10 collected over a period of time and stored in a memory. To this end, some of the embodiments of the estimation unit 30 may include additional interface with such peripheral devices as a CD/DVD drive, for example, in order to enable the estimation unit 30 to efficiently access offline data. Further, the estimation unit 30 may cooperate with a persistent storage device such as the memory unit 44. Because some of the contemplated embodiments of the estimation unit 30 may include little or no internal memory, the memory unit 44 may store real time and/or historical data related to the operation of the control loop 10.

In another embodiment, the parameter estimation unit 30 may reside inside a computer host such as a stationary or portable workstation which, in turn, may be disposed inside or outside the single-output process control loop 10. For example, the parameter estimation unit 30 may be a software application stored in a memory of a workstation receiving measurement data from the transmitter 22 and at least some of the sensors 32-37 via any suitable communication means, including those known in the art. More specifically, some or all of the transmitter 22 and the sensors 32-37 may report measurements related to the operation of the process control loop 10 via a digital bus, a wireless link, or a combination thereof. In some embodiments, the parameter estimation unit 30 may include both software and hardware components such as dedicated processors or memory, for example. In yet another embodiment, the parameter estimation unit 30 may be a software application distributed over several hardware components.

While the parameter estimation unit 30 may be programmed or configured to determine any desired process or device parameter using any desired statistical analysis, particularly useful statistical approaches for determining a friction estimate, a dead band estimate, a dead time estimate, and a shaft windup estimate are described in detail herein. However, the present invention is not limited to the use of any of these approaches and, furthermore, is not limited to the determination of segment-specific estimates for only these specific parameters; it being understood that other statistical approaches can by used to determine these or other device or process parameters according to the present invention.

One approach to determining a friction estimate for a process control device, such as a sliding stem valve or a rotary valve, is to have the estimation unit 30 collect data pertaining to the actuator travel or position (sensed by, for example, the position sensor 37 of FIG. 1) and the actuator pressure (sensed by, for example, the pressure sensor 34 or 36 of FIG. 1) for the valve over a particular time period. Typically, the collected data will be stored in memory as a series of data points, wherein each data point has an actuator pressure component derived from the measured actuator pressure signal and an actuator position component derived from the measured actuator position or travel signal. Of course, it will be understood that the actuator pressure and actuator position components of any data point should relate to the same time. Thus, it is preferable, when using two or more measured signals, to sample those signals at the same time to thereby produce time correlated data.

Figure 2:
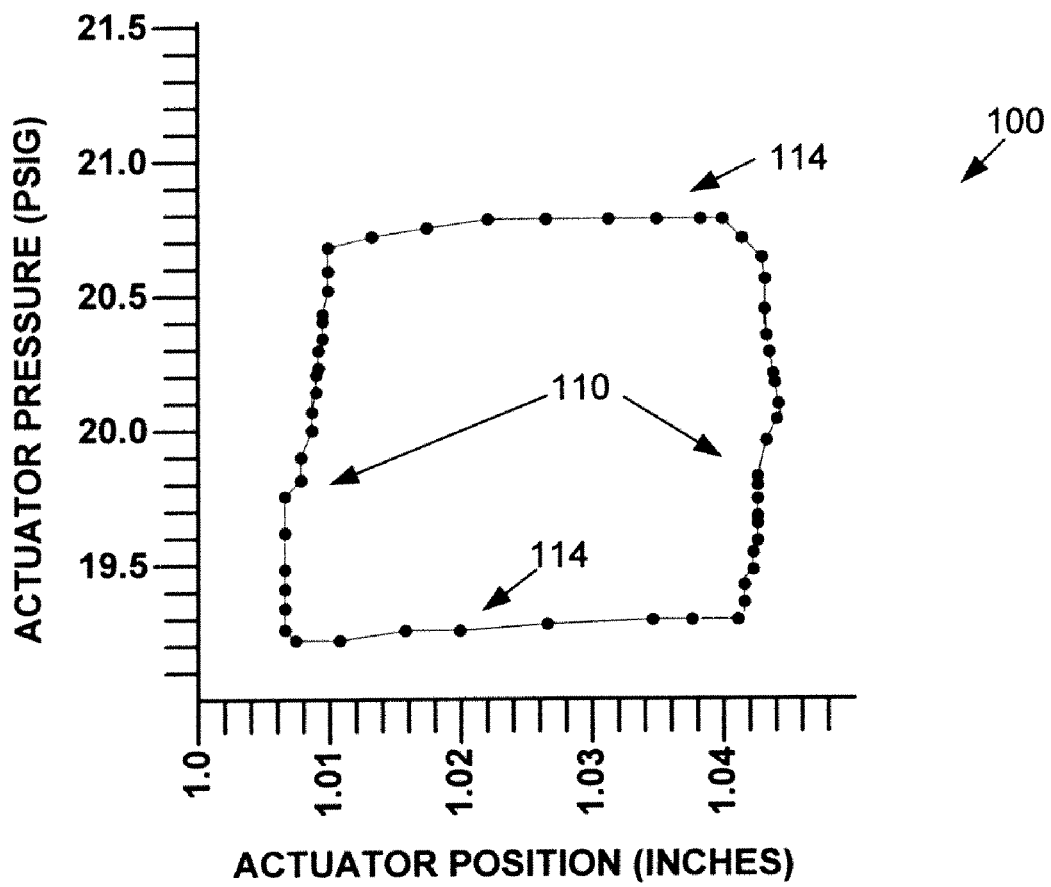
FIG. 2 illustrates a plot of actuator pressure versus actuator travel percentage for a typical sliding stem valve.

FIG. 2 illustrates a plot 100 of actuator pressure versus actuator position for a typical sliding stem valve. In particular, each point of the plot 100 corresponds to a concurrent measurement of actuator pressure and actuator position. The plot 100 corresponds to a single cycle of operation during which the actuator operates through a friction zone. Those skilled in the art will appreciate that upon a reversal of direction, the moveable element of the valve operates through a friction zone in which the applied pressure increases or decreases a significant amount with little or no resulting movement of the moveable valve element. This friction zone, which is caused by friction within the valve, is generally indicated by the more vertical lines 110 in FIG. 2. Upon exiting the friction zone, the moveable valve member then moves a significant amount with relatively little change in the applied pressure. This operation is generally indicated by the more horizontal lines 114 in FIG. 2. Of course, other methods of representing the relationship between actuator pressure and actuator position are also available. For example, actuator pressure and actuator position can be plotted separately versus time. By aligning the two resulting plots along the same timeline, the plots can be simultaneously analyzed to detect the amount of pressure required to enable the movement of the actuator. Thus, one of ordinary skill in the art will appreciate that the exemplary plots discussed herein are presented by way of illustration only.

Figure 3:
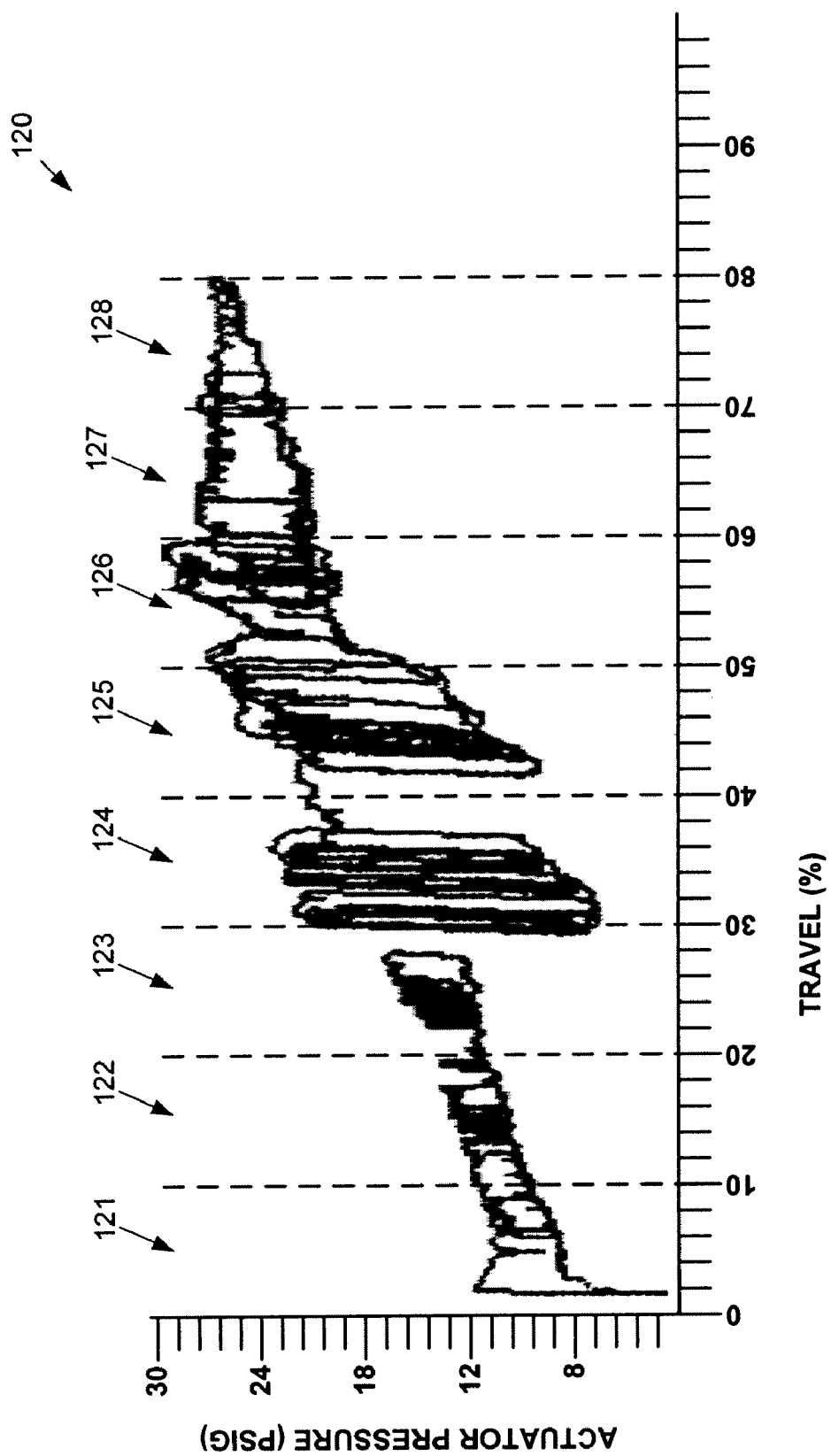
FIG. 3 illustrates a plot corresponding to multiple measurements of actuator pressure versus actuator travel percentage for a typical sliding stem valve.

One of ordinary skill in the art will further appreciate that a single cycle of operation generally fails to provide sufficient indication of how well a sliding stem valve operates. In particular, the location of the friction zone of a valve depends upon the position of the moveable valve element with respect to the operating range of the element. Referring to FIG. 3, a plot 120 represents the operation of the moveable valve element through 80% of the range of operation during a plurality of cycles. As in FIG. 2, the plot 120 includes multiple vertical lines, each corresponding to a friction zone for a particular cycle of operation. Also as in FIG. 2, the more horizontal lines of the plot 120 correspond to those regions of travel where the stem moves due to a relatively small change in pressure.

As discussed above, the known methods of estimating process variables fail to indicate that the sliding stem of this valve does not encounter the same force of friction at different segments. For example, estimating the average friction for the entire 0% to 80% range of travel illustrated in FIG. 3 effectively filters out the difference between the friction in the 0-10% range of travel and the friction in the 10%-20% range. In other words, estimating the average friction value based on the data illustrated in FIG. 3 by the known means can only produce a single value. This single value fails to reflect the existence of one or more localized problems, much less the location of these problems within the available range of travel.

In one of the disclosed examples, these deficiencies are overcome by logically dividing the range of travel into several regions, each region having a particular size. It will be further understood that the size of a region may correspond to a number of data points associated with the region, percentage of travel associated with the region, an absolute measurement (e.g., degrees of rotation) associated with the region, amount of time during which process measurements were collected for the particular region, as well as other methods of dividing a range of travel known in the art. As illustrated in FIG. 3, the exemplary plot 120 includes the regions 121-128. In this particular example, the 0%-80% range of travel is divided into eight non-overlapping segments of equal size. However, some of the possible embodiments may involve regions having different sizes. For example, it is contemplated that in some applications, certain ranges of travel may be associated with a higher probability of failure. For example, operators or manufacturers may observe, based on either theoretical or empirical data, that a certain sliding stem valve is more likely to break in the 40-50% range of travel after a prolonged use. The operator may then decide to define segments in such a way that the 40-50% range of travel has more segments than all other ranges. Thus, the operator may partition the 40-50% range of travel in 5 separate regions while defining only 1 region for the 30-40% range of travel. Further, the operator may define at least partially overlapping segments to improve the reliability of certain statistical inferences, for example. Although the examples discussed below refer only to embodiments relying on non-overlapping, equal-sized segments, it is contemplated that in certain applications, the range of travel may include overlapping segments, segments of variable size, or both.

Figure 4:
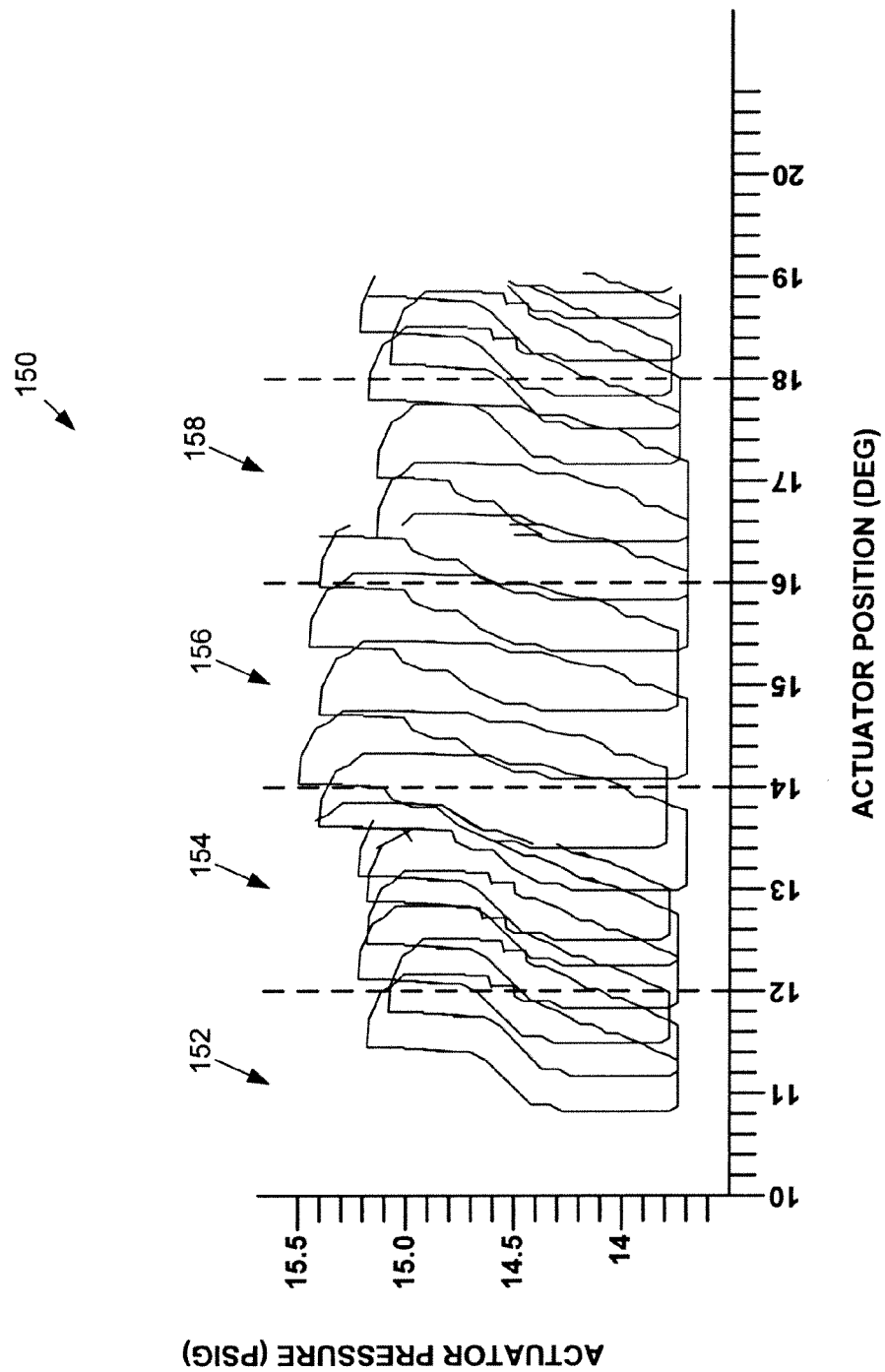
FIG. 4 illustrates a plot corresponding to multiple measurements of actuator pressure versus actuator travel percentage for a typical rotary valve.

Meanwhile, the range of travel of a typical rotary valve may be divided into a plurality of regions based on a fixed or variable number of degrees. FIG. 4 illustrates a plot 150 of actuator pressure versus actuator position for a typical rotary valve. Similarly to a sliding stem valve, the moveable element of a rotary valve operates, upon a reversal of direction, through a friction zone in which the applied pressure increases or decreases a significant amount with little or no resulting movement of the moveable valve element. As is also the case with a sliding stem valve, the plot of actuator pressure versus radial position of the actuator includes several substantially vertical lines. These lines correspond to friction zones in which there is little or no movement of the actuator in response to a change in pressure applied to the actuator. In accordance with the available method of measuring valve friction, the data points associated with the entire available range of motion are processed to estimate the average friction. However, the rotary valve may encounter friction in the range between 10 and 12 degrees, illustrated as region 152 in FIG. 4, which is significantly different from friction encountered in the range between 14 and 16 degrees, for example. Moreover, each of the regions 152-158 may have a friction value significantly different from the average friction value associated with the plot 150. For example, the friction in the region 152 may be too low while the friction in the region 156 may be too high. Meanwhile, the average friction of the rotary valve, as obtained from the plot 150 viewed as a single undivided set of data, may be equal or acceptably close to a value indicative of a healthy status of the valve.

To properly detect localized problems, calculate a difference between various segments of travel, and obtain other indications of valve operation, the parameter estimation unit 30 may separately calculate such parameters as friction, dead band, shaft windup, etc. for some or all of the segments 121-128 or 152-158. In some embodiments, an authorized user may configure the parameter estimation unit 30 with the number of segments associated with the available range of travel. Optionally, the user may specify the size and the boundaries of each segment. In some embodiments, the user may also specify whether one or more segments to which the calculation should be restricted. However, it is expected that most operators would generally prefer to process the entire available set of data to reduce the probability of inadvertently overlooking a segment or sub-range of the travel in which a problem has developed.

The parameter estimation unit 30 may iteratively step through the data corresponding to each of segments 121-128 or 152-158 to detect each segment-specific value of friction, dead band, dead time, shaft windup, etc. Referring again to the data points forming the plots 100 and 120, the more vertical sections of the plots represent regions of little or no actuator movement in response to a substantial change in actuator pressure. Thus, for the given segment of travel, the data points within the friction zone are discarded to thereby leave data generally corresponding to that which borders or to that which is outside the friction zone. The approach for selecting the reduced data set differs slightly depending upon whether the valve is a sliding stem valve or a rotary valve. For a sliding stem valve, the sliding stem is typically stationary within the friction zone. As a result, for a these types of valves, the reduced data set may be formed by including only those points at which actuator movement is actually occurring. A point may be included in this set, for example, if the difference between the actuator position of the point and the actuator position of the previous point exceeds a predetermined threshold. For example, when the difference between the actuator position of consecutive points exceeds 0.01% of full travel, the second point may be selected as a point within the reduced data set (i.e., wherein the actuator is actually moving). Of course, any other desired threshold may apply and any other method of determining actuator movement may be used instead to generate the reduced data set.

For a rotary valve, the data that outlines or borders the friction zone may be determined by evaluating one or more conditions. First, the slope of the actuator pressure versus actuator position may be computed at each point and then compared to a threshold. The slope at a point may be computed by determining the point-to-point slope at a given point (i.e., the slope of a line drawn between the point in question and the previous or next point), by taking the slope of a best fit line (such as a line developed using a least squared error analysis) determined from the point in question and two or more surrounding points, or in any other desired manner. If the computed slope at a point is less than the threshold, then the point may be chosen for the reduced data set because that point is outside of the friction zone. On the other hand, if the slope is greater than the slope threshold, then the data point is within the friction zone and may be discarded. If desired, the slope threshold may be predetermined or predefined (e.g., by an operator) or may be defined as a function of the slope of a best fit line (e.g., a least squared error line) through all of the collected data.

Next, the change in pressure between consecutive points may be calculated and, if the pressure change is greater than a predetermined threshold of, for example, 0.05%, then the point is considered to be within the friction zone. It will be understood that one or both of these conditions may be used to determine if a point is within the friction zone or not. Thus, for example, if either the slope threshold or the pressure threshold of a point is exceeded, then the point may be considered to be within the friction zone and discarded. Alternatively, a point may be considered to be within the friction zone only when both the slope and the pressure threshold are exceeded. Furthermore, if desired, either one or both of these approaches may be used with sliding stem valves.

After generating the reduced data set as described above, the remaining data points typically fall within one of two clusters bordering the friction zone of the valve device. After the reduced data set is formed, it is beneficial to detrend the data, that is, remove any linear trends caused by, for example, the actuator spring force (which varies over the range of the actuator movement). There are many approaches to estimating the best fit line to the data for detrending the data. For example, one approach is to calculate the best fit line through all of the data within the reduced data set. In other cases, it may be preferable to fit a separate line to the data on each side of the friction zone, i.e., use a separate line fit routine for each of the clusters. One of ordinary skill in the art will further appreciate that various alternative methods of reducing data sets, detrending data, calculating the best fit line, as well as other statistical techniques may be used to analyze the data.

Figure 5:
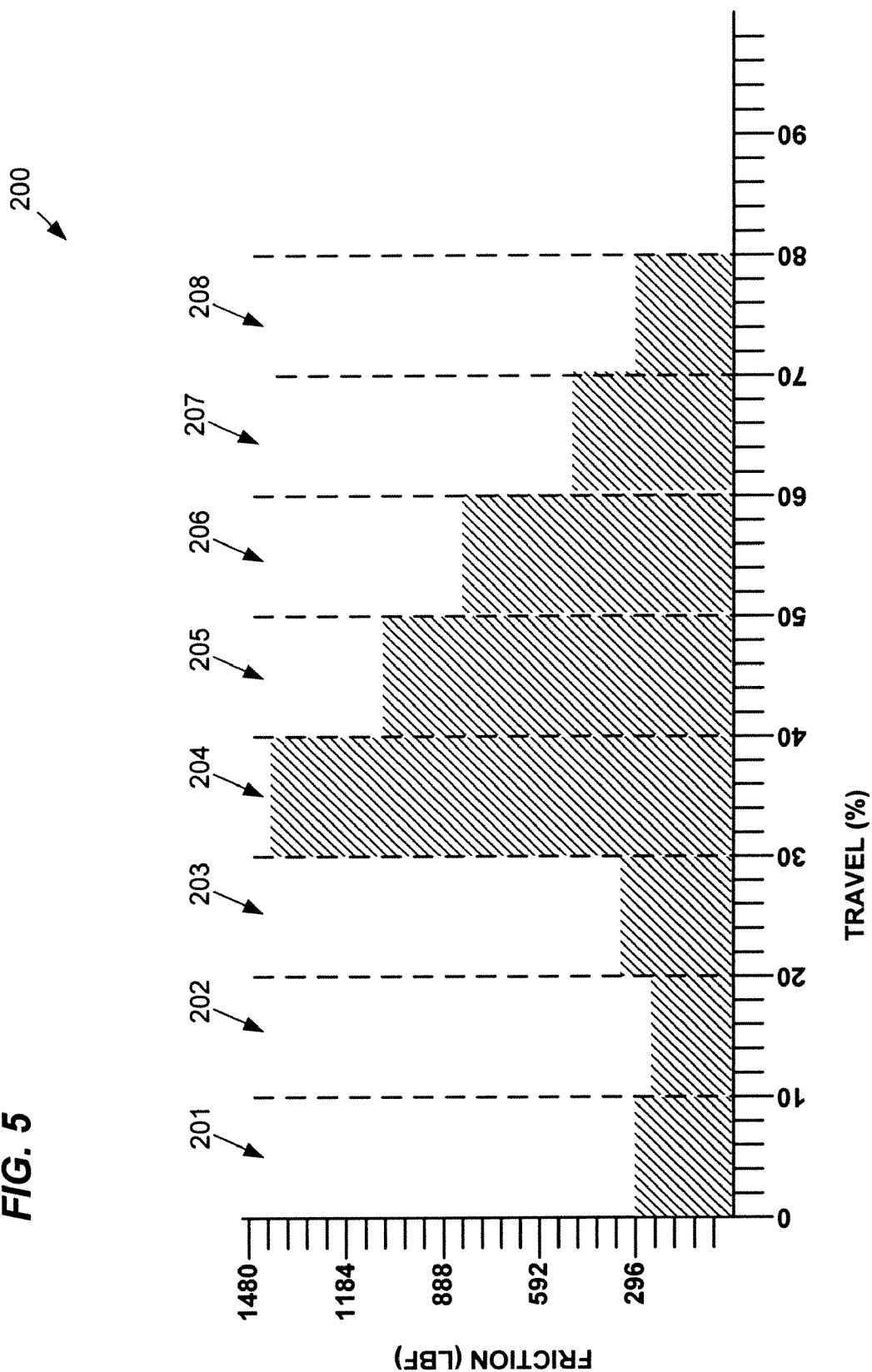
FIG. 5 is a segment-based histogram representation of the data corresponding to the plot illustrated in FIG. 3.

After the data associated with one or more segments is reduced and/or detrended, the parameter estimation unit 30 may estimate the segment-specific value of a process parameter. For example, the estimation unit 30 may obtain the friction of a sliding stem valve in the 20%-30% range of travel by applying the method disclosed in the U.S. Pat. No. 6,466, 893, or by applying any other method to the complete or reduced data set. The estimation unit 30 may then transmit the results of calculating one or segment-specific estimates to the display 38 or to any other output device. FIG. 5 illustrates a histogram 200 which includes bars 201-208. Each of the bars 201-208 corresponds to one of the segments 151-158 of the plot 150 illustrated in FIG. 3. In particular, the height of each bar may represent the value of friction associated with one of the travel segments. It will be appreciated that the histogram 200 visually communicates segment-specific friction of the segments 151 to 158 in a clear, easy-to-understand manner. By quickly looking over the histogram 200, the operator may immediately suspect that the valve 18 may be sticking in the segment 204 or that the packing of the valve 18 may have degraded in regions 201-203 and 208. The operator may then physically inspect the valve, compare each of the potentially faulty segments to a predefined value, or take other suitable action to confirm or disprove the suspicion.

Additionally, the display unit 38 may display the plot 120 along with the histogram 200 in order for the operator to visually confirm the preliminary results he or she reaches by noticing a particularly high or low histogram bar. To continue with the example discussed above, the operator or engineer may wish to confirm that the histogram bar 204 in fact corresponds to that portion of the plot 150 where the clusters of data points forming the more horizontal sections of the graph are spaced farther apart than in the other segments. Of course, the plot 150 illustrates the complete data set prior to exclusion of the more points associated with friction zones and prior to detrending the set. However, as evidenced by the overall shape of the plot 150, the operator may nevertheless recognize that the clusters of points that appear stretched in a vertical dimension tend to indicate higher values of friction (when the axis of ordinates is selected for pressure and the abscissa is selected for travel).

In another embodiment, the estimation unit 30 stores threshold values associated with some or all of the friction, dead band, dead time, or shaft windup. Preferably, the estimation unit 30 stores a low threshold value and a high threshold value to detect both excessive and insufficient values of these process parameters. For example, the estimation unit 30 may store a high threshold friction value of 1100 $lb_f$ and a low threshold friction value of 300 $lb_f$. In operation, the estimation unit 30 may identify each of the histogram bars 201-208 having a height outside the 300-1100 $lb_f$ range. By analyzing the example histogram 200 illustrated in FIG. 5, the estimation unit 30 may thus determine that the regions corresponding to the bars 201, 202, 204, and 207 have unacceptable friction values. In response to detecting one or more such values, the estimation unit 30 may trigger an alarm, create an entry in an even log, initiate a message to the operator, or perform a similar operation.

In some embodiments, the estimation unit 30 may additionally calculate the overall average associated with the range of travel including all segments 121-128 of a sliding stem valve and the segments 152-158 of a rotary valve. It is contemplated in some applications, it may be desirable to identify which sections of travel of a moveable part, if any, differ from the overall average by a certain number of standard deviations, for example. To this end, the estimation unit 30 may obtain the average friction value for the relevant range of travel, compare the friction of each individual segment to the average friction value to calculate the standard deviation, and identify those segments which significantly differ both from the average and from the rest of the segments. This approach may be useful in investigating the wear and tear characteristics of a device, for example.

In yet another embodiment, the display unit 38 may render the highest and lowest histogram in a color different from the rest of the histogram 200. In this manner, the display unit 38 may direct the operator's attention to the relevant (i.e., potentially problematic) sections of the histogram. Thus, an operator responsible for a large number of control loops 10, valves 18, or other devices having moveable components, may quickly notice the potential problems even when paying relatively little attention to a console monitor. Of course, the estimation unit 30, the display unit 38, and other components may also provide other visual or audio means of attracting human attention to values significantly deviating from a predefined norm or from the average associated with a particular device.

As indicated earlier, the method discussed above with respect to estimating friction may be also applied to calculate other process variables such as shaft windup, for example. FIG. 6 illustrates two plots of the actuator pressure versus actuator travel for movement of a rotary valve in one complete cycle through the friction zone. In particular, the plot 230 includes data points corresponding to approximately 10.2 to 10.7 degrees of travel of a particular rotary valve. Meanwhile, the plot 250 illustrates the movement of the same valve between approximately 11.2 and 11.7 degrees of travel. As illustrated in FIG. 6, shaft windup is the movement of the valve element which occurs before the actuator pressure reaches a maximum (or minimum) value which causes continued movement of the valve element. As one will easily notice through a cursory inspection of FIG. 6, the plots 230 and 250 form different geometric shapes. Specifically, the plot 250 includes a steeper slope of the section in which the shaft windup occurs. Thus, an operator may recognize that the shape which appears more stretched out in the horizontal dimension corresponds to a greater windup value. Of course, as illustrated in FIG. 4, the estimation unit 30 preferably collects or otherwise obtains data for multiple cycles of operation.

Thus, after collecting actuator pressure versus actuator travel data for a valve, the estimation unit 30 may compute the shaft windup at any particular occurrence and then estimate the shaft windup associated with a particular segment of travel as the average or median of all shaft windup occurrences within this segment. To determine the shaft windup in any particular instance, the estimation unit 30 may monitor the slope of the actuator pressure versus the actuator travel curve. Shaft windup generally starts where the magnitude of the slope increases significantly (or becomes greater than a certain amount) and ends where the magnitude of the slope decreases significantly (or becomes less than a certain amount). As will be understood, the actuator travel movement (typically expressed as a percent of full travel) between the start and end points is the shaft windup for the particular occurrence.

Figure 7:
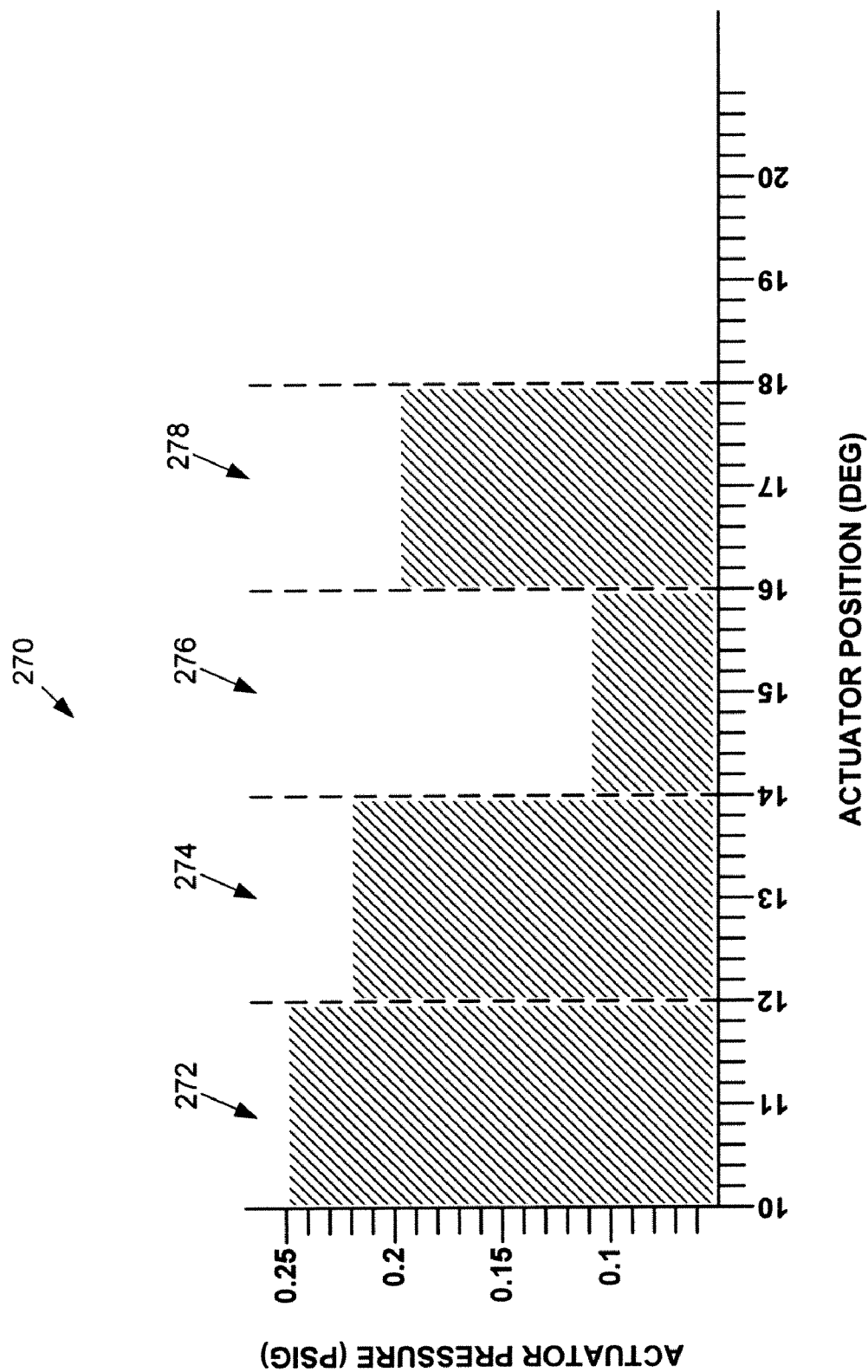
FIG. 7 is a segment-based histogram representation of a data set which includes the subsets corresponding to the plots illustrated in FIG. 4.

Upon estimating shaft windup values for one or more segments of travel, the display unit 38, the computer workstation 42, or other unit having a display may represent the results graphically, as in a histogram 270, for example (FIG. 7). Each of the bars 272-278 may correspond to a certain amount of travel. In the example illustrated in FIG. 7, the bar 276 appears significantly lower that the bars 272, 274, and 278. By inspecting the histogram 270, an operator may immediately determine that, at the very least, shaft windup of the rotary valve is not the same for each section of travel. The operator may then manually check whether the bar 272 points to an unacceptably low windup in the section of travel between 14 and 16 degrees, or whether the bars 272, 274, and 278 indicate excessively high windup values.

In a similar manner, the method may be applied to dead time and dead band estimates for sliding stem valve, a rotary valve, or other device having a component which moves through a predefined range of travel. For example, the estimation unit 30 may calculate the dead band associated with a particular section of travel by assuming that the dead band is mostly caused by friction and dividing the friction estimate for the segment by the open loop gain of the device. Segment-specific estimates of the dead band of the device may be similarly displayed in form of a histogram, automatically compared to one or more thresholds, and/or statistically processed to determine the average value and the standard deviation. Further, the estimate unit 30 may trigger an alarm for one or more segments significantly deviating either from the predefined values or from the calculated average.

Additionally, the estimation unit 30 may generate segment-specific dead time estimates for the valve 18 or other moveable component of a device operating in the control loop 10. To this end, the estimation unit 30 may perform cross-correlation analysis of the input signal (such as that produced by the controller 12 and measured by the current sensor 32 of FIG. 1) and the actuator travel or position signal (such as that measured by the position sensor 37 of FIG. 1). The estimation unit 30 may perform this or other type of statistical correlation analysis for a given segment travel of travel to determine a time shift between the output and the input signals.

In addition to calculating segment-specific process parameters of the control loop 10 for a particular set of measurements, the estimation unit 30 may also generate trend data for one or more of these parameters. More specifically, the estimation unit 30 may store measurements related to one or more of friction, shaft windup, dead time, and dead band over a substantially long period of time (days, months, years, etc.). In some contemplated embodiments, the estimation unit 30 includes or cooperates with a persistent memory such as the memory unit 44. Upon obtaining a segment-specific measurement, the estimation unit 30 may store the measurement along with a timestamp in the persistent memory. Alternatively, the estimation unit 30 may periodically generate and store "snapshots" of some or all of the calculated segment-specific process parameters. Preferably, the estimation unit 30 stores friction and other parameters for each segment of travel to enable trending of multiple segments over time.

Figure 8:
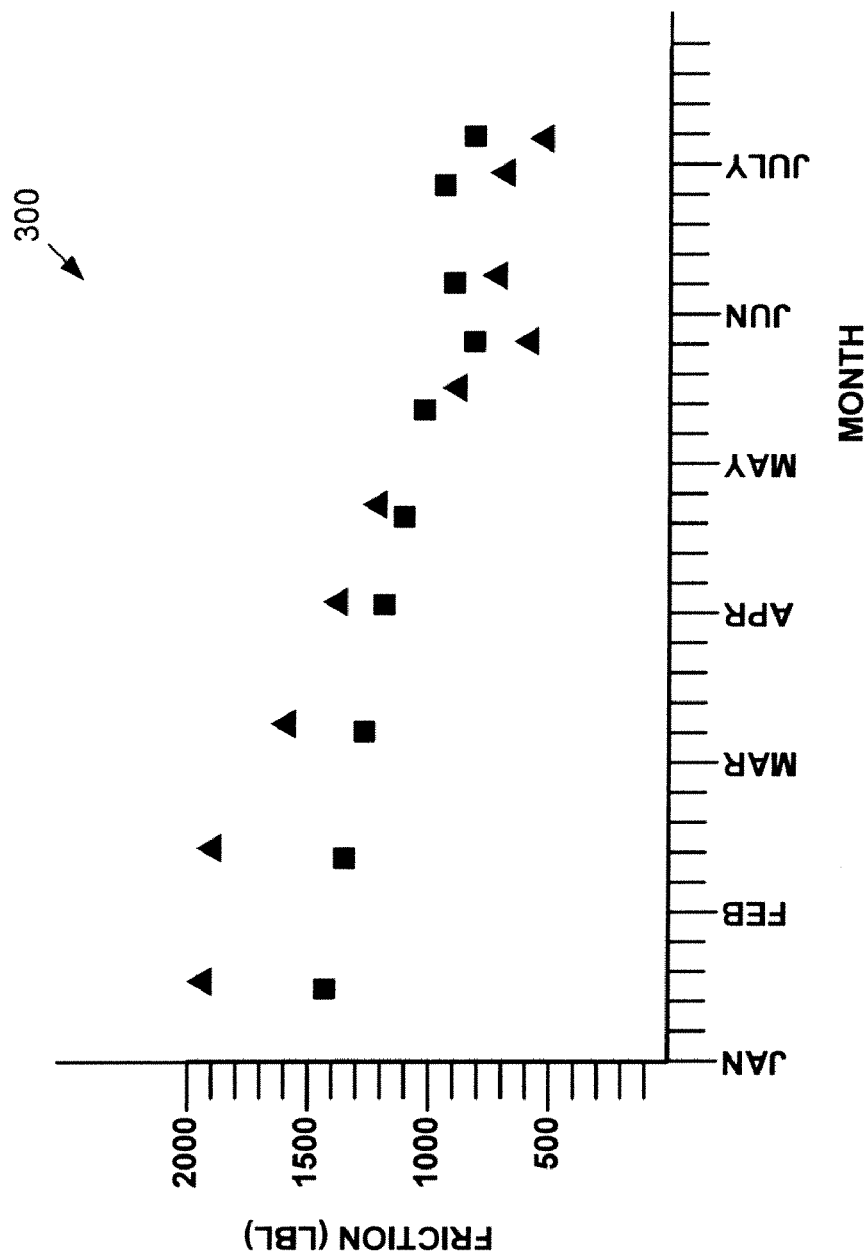
FIG. 8 is a graph illustrating trending of friction values measured for two distinct travel segments of a typical valve over a period of time.

The estimation unit 30 may then plot trend data for one or more segments in response to receiving a request from the operator via the input unit 40, for example. Alternatively, the estimation unit 30 may plot trend data upon timer expiration and according to some predefined schedule. It will be appreciated that average data for a particular segment may yield such non-obvious information about the valve actuator or some other moveable part as, for example, the average rate of deterioration over a predefined period, unexpectedly low or high changes over a period of time, etc. Additionally, trend data for several segments may be used to identify one or segments which may deteriorate at a faster rate than the rest of the segments or a predefined target rate. Referring to FIG. 8, the plot 300 illustrates the measurements of friction for two segments of actuator travel trended over a six month period. In this example, the symbol 302 marks average measurements corresponding to a segment of travel between 30% and 40%, and the symbol 304 represents average measurements of the 20% to 30% travel for a certain sliding stem valve.

It will be appreciated that the example plot 300 illustrates a faster loss of friction in the 30%-40% segment of travel. As illustrated in FIG. 8, the initial measurement of friction for this segment appears to be significantly higher than the friction of the 20%-30% segment of travel. However, the friction of this segment drops from approximately 1900 $lb_f$ in January to about 500 $lb_f$ in July, whereas the decrease in friction associated with the 20%-30% segment of travel drops from about 1500 $lb_f$ to about 700 $lb_f$. By observing the trend illustrated by the plot 300, an operator or engineer may conclude, for example, that the wear of the moveable component (or of the static component interacting with the moveable component) is more pronounced in the 30%-40% segment of travel. One of ordinary skill in the art will further appreciate that engineers may apply this data to improve the future design of the device or of the moveable components used in the device.

On the other hand, trend data collected and plotted for a single segment of travel may also yield important information, such as an approximate measurement of the rate at which a parameter of a device changes over time. To continue with the example of friction measurements illustrated in FIG. 8, the estimation unit 30 may calculate the best fit line (not shown) for all measurements marked with the symbol 302 in FIG. 8. The slope of the best fit line will yield an estimate of the rate of loss of friction associated with the 30%-40% segment of travel. Of course, the estimation unit 30 may also apply other statistical methods to trend data associated with an individual segment to determine the rate of change and other characteristics of the corresponding trend.

Figure 9:
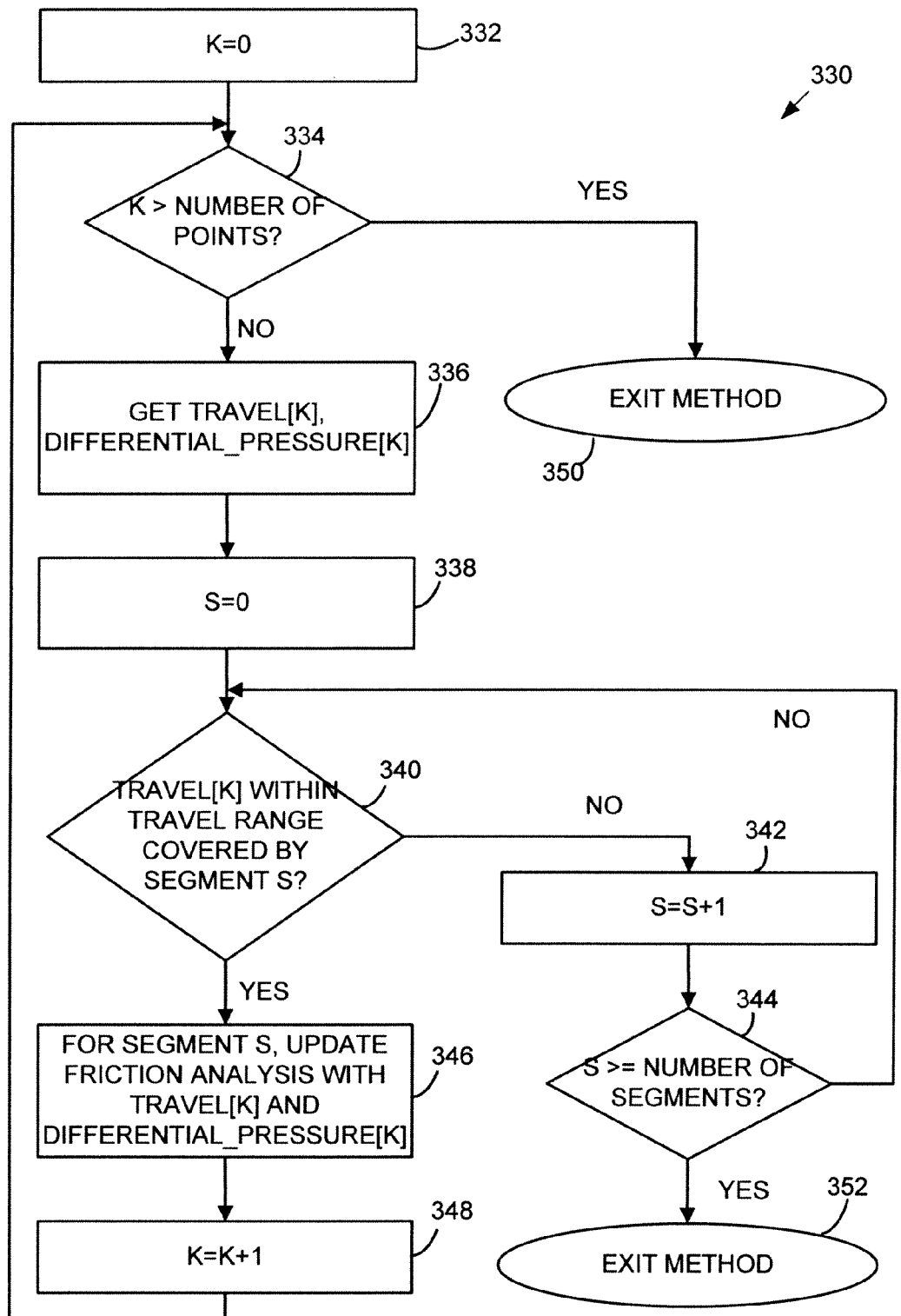
FIG. 9 is a flowchart illustrating one possible generalized algorithm of estimating segment-specific friction values.

FIG. 9 illustrates a block diagram of a software routine 330 that may be executed on the estimation unit 30 to estimate friction for each of several travel segments of a valve actuator. One of ordinary skill in the art will also appreciate that the software routine 330 may also run on a workstation 42, on a computer communicatively coupled to the control loop 10, or on a standalone computer or other intelligent device capable of receiving process measurement data via a memory drive, a wired or wireless modem, or via any other communication or storage means known in the art. As indicated above, the software routine 330 may also be a part of a software package responsible for other control and maintenance functions of the control loop 10 or of the valve 18. For example, the AMS ValveLink® software package, available from Emerson Process Management, may include the software routine 330 as a component. It will be further appreciated that the software routine 330 may process data arriving from the control loop 10 in substantially real time or, alternatively, may perform post-time processing of data received from the sensors 32-37 and stored in the memory unit 44, for example. Moreover, the software routine 330 may interact with an external storage device during operation to obtain measurement data.

In general, the software routine 330 may retrieve actuator pressure and position data from an array or a linked list. In one contemplated embodiment, the estimation unit 30 or the memory unit 44 may store this data in a two dimensional array indexed by a relative or absolute time counter. For example, the array may store a plurality of tuples, each tuple including a measurement of actuator pressure and actuator position collected at the same point in time. As illustrated in FIG. 9, the software routine 330 may step through the array and update a corresponding segment-specific friction estimate with the information stored in the current array element. In particular, the software routine 330 may initialize an array counter, k, at a block 332. Next, the software routine may iterate through some or all of the blocks 334-348 as many times as the number of elements in the array storing the pressure in position data.

In a block 334, the routine 330 may check whether the current value of the counter k has exceeded the size of the array. Next, the routine 330 may read the pressure/position tuple from a single or multiple arrays in a block or step 336. In the example routine illustrated in FIG. 9, actuator position data is stored in an array travel and actuator pressure data is stored in a similarly indexed array differential_pressure. However, both pressure and actuator data could also be stored in a single two-dimensional array. Preferably but not necessarily, each tuple retrieved in the step 336 corresponds to the actuator position and actuator pressure measured after a constant interval relative to the previous tuple retrieved in the step 336. In other words, the estimation unit 30 preferably samples position and pressure data at a constant rate.

In a block 338, the routine 330 initializes the segment counter s to 0. The procedure 300 then steps through the segments to determine to which segment the array element indexed by the current value of k belongs (blocks 340-344). In one possible embodiment of the procedure 330, each segment includes the same number of pressure/position tuples. Alternatively, the routine 330 may retrieve the definition of segments, including the number of segments and/or boundaries of each segment, from a persistent or volatile memory as part of configuration data. As yet another alternative, the routine 330 may receive the definition of segments as input parameters. A user may enter these parameters via the input device 40 or workstation 42.

Once the routine 330 matches the pressure/position tuple with one of the segments, the routine 330 may update the average segment-specific friction value with the data included in the tuple (block 346). The procedure 330 may apply of the methods discussed above in reference to FIGS. 2-5, for example. The routine 330 may then increment the value of k in a block 348 and return to the block 334 for the next iteration. When the counter k exceeds the size of the array or when the number of segments exceeds a predefined, predetermined, or otherwise specified limit, the routine 330 exits (blocks 350 and 352).

It will be also appreciated that the estimation unit 30 may calculate segment-specific values for dead band, dead time, and shaft windup by executing logic similar to the routine 330. To this end, the estimation unit 30 may include additional routines or may include the logic for estimating the dead band, dead time, and shaft windup as part of the routine 330.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of determining a segment-specific estimate of a parameter associated with a process control loop, the method comprising:
   measuring a signal within the process control loop when the process control loop is connected on-line within a process control environment, including:
       measuring an input signal indicative of an input parameter; and
       measuring an output signal indicative of an output parameter;
   storing the measured signal as a series of data points, each data point having a first component derived from the input signal and a second component derived from the output signal;
   partitioning the stored signal data into a plurality of data segments, wherein:
       each of the plurality of data segments corresponds to a respective range of travel of the output signal, and
       at least two of the plurality of data segments correspond to adjacent ranges of travel of the output signal;
   performing a statistical analysis on at least some of the plurality of data segments; and
   generating a set of segment-specific estimates based on the performed statistical analysis.

2. The method of claim 1, wherein partitioning the stored signal data into a plurality of data segments includes defining non-overlapping segments of equal size.

3. The method of claim 2, further comprising:
   comparing each of the segment-specific friction estimates to a threshold value;
   generating a problem indication in response to detecting that a particular segment-specific friction estimate exceeds the threshold value.

4. The method of claim 2, further comprising:
   calculating an average of the set of segment-specific estimates;
   comparing each of the set of segment-specific estimates to the average of the set of segment-specific estimates; and
   generating a problem indication in response to detecting that at least one of the set of segment-specific estimates differs from the average of the set of segment-specific estimates by more than a certain amount.

5. The method of claim 2, wherein the parameter associated with a process control loop is one of a friction, a dead time, a dead band, or shaft windup associated with a portion of the range of travel of the actuator.

6. The method of claim 2, further comprising repeating the acts of measuring a signal within the process control loop, storing the signal data, partitioning the stored signal data, and performing a statistical analysis at a later point in time to generate a second set of segment-specific estimates; and
   generating trend data by comparing the set of segment-specific estimates to the second set of segment-specific estimates.

7. The method of claim 6, wherein comparing the first subset to the second subset to generate trend data includes generating segment-specific trend data.

8. A method of determining a segment-specific estimate of a parameter associated with a valve operating in a process control loop, the method comprising:
   receiving signal data corresponding to an output signal from a process control loop, wherein the output signal is indicative of a response of the valve operating in the process control loop to an input command signal;
   storing the signal data;
   partitioning the stored signal data into a plurality of data segments, so that each of the plurality of data segments corresponds to a respective range of travel of the output signal;
   performing a statistical analysis on a first one of the plurality of data segments selected from the plurality of data segments;
   and
   generating a first segment-specific parameter estimate based on the performed statistical analysis of the first one of the plurality of data segments.

9. The method of claim 8, wherein partitioning the stored signal data into a plurality of data segments includes partitioning the stored signal data into a plurality of non-overlapping segments of substantially equal size.

10. The method of claim 8, further comprising performing a statistical analysis on a second one of the plurality of data segments to generate a second segment-specific parameter estimate.

11. The method of 10, further comprising providing the first and second segment-specific parameter estimates to a user via a display unit.

12. The method of claim 11, wherein the first and second segment-specific parameter estimates to a user via a display unit includes displaying a histogram, wherein each bar in the histogram is associated with one of the segment-specific parameters.

13. The method of claim 8, wherein receiving signal data corresponding to a signal from a process control loop includes measuring the signal within the process control loop when the process control loop is connected on-line within a process control environment.

14. The method of claim 8, wherein receiving signal data corresponding to a signal from a process control loop includes receiving signal data corresponding to the signal generated at a first point in time and a second point in time; and
   wherein performing a statistical analysis on a first one of the plurality of data segments includes:
   generating a first value corresponding to the first segment-specific parameter estimate at the first point in time;
   generating a second value corresponding to the first segment-specific parameter estimate at the second point in time; and comparing the first and the second values to determine a first trend in the segment-specific parameter.

15. The method of claim 14, further comprising:
performing a statistical analysis on a second one of the plurality of data segments to generate a second segment-specific parameter estimate;
generating a third value corresponding to the second segment-specific parameter estimate at the first point in time;
generating a fourth value corresponding to the second segment-specific parameter estimate at the second point in time;
comparing the first and the second values to determine a second trend in the second-specific parameter.

16. A method of determining a segment-specific estimate of a parameter associated with a process control loop, the method comprising:
receiving signal data corresponding to a signal from a process control loop, including receiving measurements of an actuator pressure signal and an actuator position signal of a device having an actuator that moves in response to actuator pressure and has a range of travel; and
storing the signal data, including storing a series of tuples, each tuple including an actuator pressure value derived from the actuator pressure signal and an actuator position value derived from the actuator position signal;
partitioning the stored signal data into a plurality of data segments;
performing a statistical analysis on a first one of the plurality of data segments selected from the plurality of data segments; and
generating a first segment-specific parameter estimate based on the performed statistical analysis of the first one of the plurality of data segments.

17. The method of claim 16, wherein the first segment-specific estimate is one of a friction, a dead time, a dead band, or shaft windup associated with a portion of the range of travel of the actuator.

18. The method of claim 17, further comprising comparing the first segment-specific estimate to a threshold value to conditionally generate a problem indication, wherein the problem indication is generated if the first segment-specific estimate is substantially higher or substantially lower than the threshold value.

19. A method of determining a segment-specific estimate of a parameter associated with a process control loop, the method comprising:
receiving signal data corresponding to a signal from a process control loop; including receiving signal data corresponding to the signal generated at a first point in time and a second point in time; wherein the first and the second points in time are selected in accordance with a maintenance cycle associated with the process control loop;
storing the signal data
partitioning the stored signal data into a plurality of data segments;
performing a statistical analysis on a first one of the plurality of data segments selected from the plurality of data segments, including:
generating a first value corresponding to the first segment-specific parameter estimate at the first point in time;
generating a second value corresponding to the first segment-specific parameter estimate at the second point in time; and
comparing the first and the second values to determine a first trend in the segment-specific parameter; the method further comprising:
generating a first segment-specific parameter estimate based on the performed statistical analysis of the first one of the plurality of data segments.

20. The method of claim 19, wherein the maintenance cycle is 30 days or less.

21. A computer program stored on a computer readable medium for use in controlling a processor based on data stored in a memory associated with the processor, the program performing the steps of:
reading from a memory a data net indicative of a signal associated with a process control loop operating within a process control environment;
dividing the data set into a plurality of sections, wherein each of the plurality of sections corresponds to a segment of a range of operation of a device operating in the process control loop, and wherein at least two sections correspond to adjacent segments of the range of operation of the device; and
performing a statistical analysis on data associated with a first one of the plurality of sections to produce a first segment-specific estimate of a parameter associated with the process control loop.

22. The computer program of claim 21, further comprising the step of performing a statistical analysis on a second one of the plurality of sections to generate a second segment-specific estimate of the parameter.

23. The computer program of claim 22, further comprising the step of comparing the first segment-specific estimate of the parameter and the second segment-specific estimate of the parameter to a threshold value.

24. The computer program of claim 22, further comprising the step of comparing the first segment-specific estimate of the parameter and the second segment-specific estimate of the parameter to an average value of the parameter associated with the complete data set.

25. The computer program of claim 21, wherein the step of performing a statistical analysis on a first one of the plurality of sections includes:
generating a first value corresponding to the segment-specific parameter estimate at a first point in time;
generating a second value corresponding to the first segment-specific parameter estimate at a second point in time; and
comparing the first and the second values to determine a trend in the segment-specific parameter.

26. The computer program of claim 21, wherein the process control loop includes a valve having a moveable actuator and wherein the parameter is one of a friction, a dead time, a dead band, or shaft windup.

* * * * *